(12) United States Patent
Tarenga

(10) Patent No.: US 7,378,623 B2
(45) Date of Patent: May 27, 2008

(54) DOUBLE WALLED INDUCTION HEATED ARTICLE OF COOKWARE

(75) Inventor: Roberto Tarenga, Milan (IT)

(73) Assignee: Meyer Intellectual Properties Limited (VG)

( * ) Notice: Subject to any disclaimer, the term of this patent is extended or adjusted under 35 U.S.C. 154(b) by 0 days.

(21) Appl. No.: 11/466,860

(22) Filed: Aug. 24, 2006

(65) Prior Publication Data
US 2006/0289487 A1 Dec. 28, 2006

Related U.S. Application Data

(63) Continuation-in-part of application No. 10/766,221, filed on Jan. 28, 2004, now Pat. No. 7,097,064.

(51) Int. Cl.
H05B 6/10 (2006.01)
A47J 27/00 (2006.01)

(52) U.S. Cl. .............. 219/621; 219/649; 126/390.1; 220/573.1; 29/521

(58) Field of Classification Search ........ 219/620–624, 219/647, 649; 126/390.1, 246, 375.1; 220/573.1, 220/62.17, 626; 29/521, 428, 525.14, 439, 29/505, 514
See application file for complete search history.

(56) References Cited

U.S. PATENT DOCUMENTS

| 3,837,330 | A | 9/1974 | Lanigan et al. |
| 4,204,609 | A | 5/1980 | Kuhn |
| 4,544,818 | A * | 10/1985 | Minamida ............ 219/621 |
| 4,596,236 | A | 6/1986 | Eide |
| 4,646,935 | A | 3/1987 | Ulam |
| 4,790,292 | A | 12/1988 | Kuhn |
| 5,307,951 | A | 5/1994 | Kuhn |
| 5,348,187 | A | 9/1994 | Schultz |
| 5,643,485 | A * | 7/1997 | Potter et al. ............ 219/621 |
| 5,694,674 | A | 12/1997 | Flammang |
| 5,711,290 | A | 1/1998 | Kim |
| 5,770,837 | A * | 6/1998 | Hatta et al. ............ 219/621 |
| 6,073,545 | A | 6/2000 | Huppi et al. |
| 6,267,830 | B1 | 7/2001 | Groll |
| 7,097,064 | B2 | 8/2006 | Cheng et al. |
| 2003/0160053 | A1 | 8/2003 | Kim |
| 2005/0161458 | A1* | 7/2005 | Cheng et al. ............ 220/573.1 |

FOREIGN PATENT DOCUMENTS

| EP | 752295 B1 | 1/2000 |
| GB | 2034173 A | 6/1980 |
| GB | 2333027 B | 2/2002 |
| JP | 2002070118 A | 3/2000 |

* cited by examiner

Primary Examiner—Philip H Leung
(74) Attorney, Agent, or Firm—Edward S. Sherman

(57) ABSTRACT

A dual wall cookware article is formed by bonding a ferromagnetic metal base plate to an assembly that includes an inner vessel, a thermally conductive layer and an outer vessel frame. The outer vessel frame has upright walls that surround a bottom having plural perforations. The bonding process causes the softer thermally conductive material to flow through the perforations and bond ferromagnetic metal base to the outer vessel frame and the inner vessel.

20 Claims, 3 Drawing Sheets

DOUBLE WALLED INDUCTION HEATED ARTICLE OF COOKWARE

CROSS REFERENCE TO RELATED APPLICATIONS

The present application claims priority to and is a Continuation in Part of the U.S. Patent Application for a "Double Wall Cooking Vessel" having Ser. No. 10/766,221, filed on Jan. 28, 2004, which is incorporated herein by reference.

BACKGROUND OF INVENTION

The present invention relates to improved cooking vessels, particularly to double wall cooking vessels, and in particular to methods of forming double wall cooking vessels used in induction cooking.

Double wall cooking vessels have a solid bottom surface and a pair of concentric co-axial sidewalls separated by an air gap there between. The double wall construction provides insulation so that the food stays warm after cooking, permitting the same cookware to be used as serving ware at the table.

Also known in the art is "waterless cookware", which is a cooking vessel with a self-sealing lid so that a minimum of water is used to cook the food, with the steam generated from the added water and the foodstuff itself is retained, rather than lost through the gap between the vessel's rim and cover. The extreme example of "waterless cookware" is a pressure cooker, in which a pressure containing cooking vessel has a matching lid that locks to secure a gasket between the rim and the lid. The lid must have a pressure release valve, lest the internal pressure cause a violent explosion of the vessel. The other form of "waterless cookware" involves a pot or vessel rim that extends outward from the vessel's perimeter to provide a slightly concave region where steam can condense between the extended rim and the matching lid, thus forming a "water" seal in placed of the rubber gasket in the pressure cooker. The mass of the lid serves as a "release valve" preventing excess pressure within the confined volume that holds the foodstuff. Both forms of "waterless cooking" are popular as they offer a superior method of preserving vitamins, nutrients and natural flavors, creating a more pleasing and uniform texture to the cooking food than microware methods.

Double wall cookware however has certain disadvantages. The contained wall must be sealed from water for the expected lifetime of the product, as any water that enters or seeps in during use or washing presents a hazard when converted to steam during cooking. Thus, the cookware is difficult to manufacture, as well as costly.

Dual wall cookware also suffers in performance relative to single wall cooking vessels, as the outer surface near the bottom of the vessels is easily overheated during cooking, being insulated from the remainder of the vessel.

This rapidly leads to discoloration, and distortion under extreme conditions, making the cookware unattractive for use at the table, or display in the kitchen.

Induction heating is a preferred cooking method to save energy, but is also popular because the cookware heats rapidly. However, such cookware to be suitable for use with the widest variety of induction heating systems must include special magnetic alloys in the bottom. While such alloys can be incorporate in single wall cooking vessels by numerous methods, these methods provide additional complications that hinder the fabrication of dual wall cookware that has an air gap between the sidewalls.

Accordingly, there is a need for an improved dual wall cooking vessel and method of making the same that overcomes the aforementioned disadvantages, and in particular making the vessels suitable use with induction heating stoves or burners.

It is therefore a first object of the present invention to provide an improved construction for dual wall cookware.

It is a further object for providing a reliable and cost effective method of making such an improved construction, which results in a complete and secure seal at the rim where the inner and outer walls meet.

It is a further object of the invention that the securely sealing rim is suitably shaped so that the vessel may serve as waterless cookware with the appropriate matching lid.

It is a further object of the invention to provide a dual wall cooking vessel suitable for use in induction cooking, as well as for direct heating.

SUMMARY OF INVENTION

In the present invention, a first object is achieved by forming a dual wall cookware vessel by bonding an inner vessel to an outer vessel via an intermediate layer that is deformed between perforation in the bottom of the outer vessel and an outer cap covering the bottom of the outer vessel. The outer cap is made of at least one magnetic material so that the cooking vessel can be heated by induction methods.

Another object of the invention is achieved by using a ductile thermally conductive material as the intermediate layer that bonds the perforated bottom of the outer vessel between the cap and the inner vessel.

Another object of the invention is achieved by partially filling the lower portion of the substantially vertical wall between the inner and outer vessel with the thermally conductive material during the aforementioned bonding step.

The object of achieving a suitable rim for waterless cooking is achieved by aligning and welding the bottoms of the inner and outer vessels, which form the dual walls together before the friction bonding step. This results in the precise alignment of the previously formed inner and outer rim portions that can be consistently welded together to form the water tight seal between the inner and outer wall.

The above and other objects, effects, features, and advantages of the present invention will become more apparent from the following description of the embodiments thereof taken in conjunction with the accompanying drawings.

DETAILED DESCRIPTION

Figure 1A:
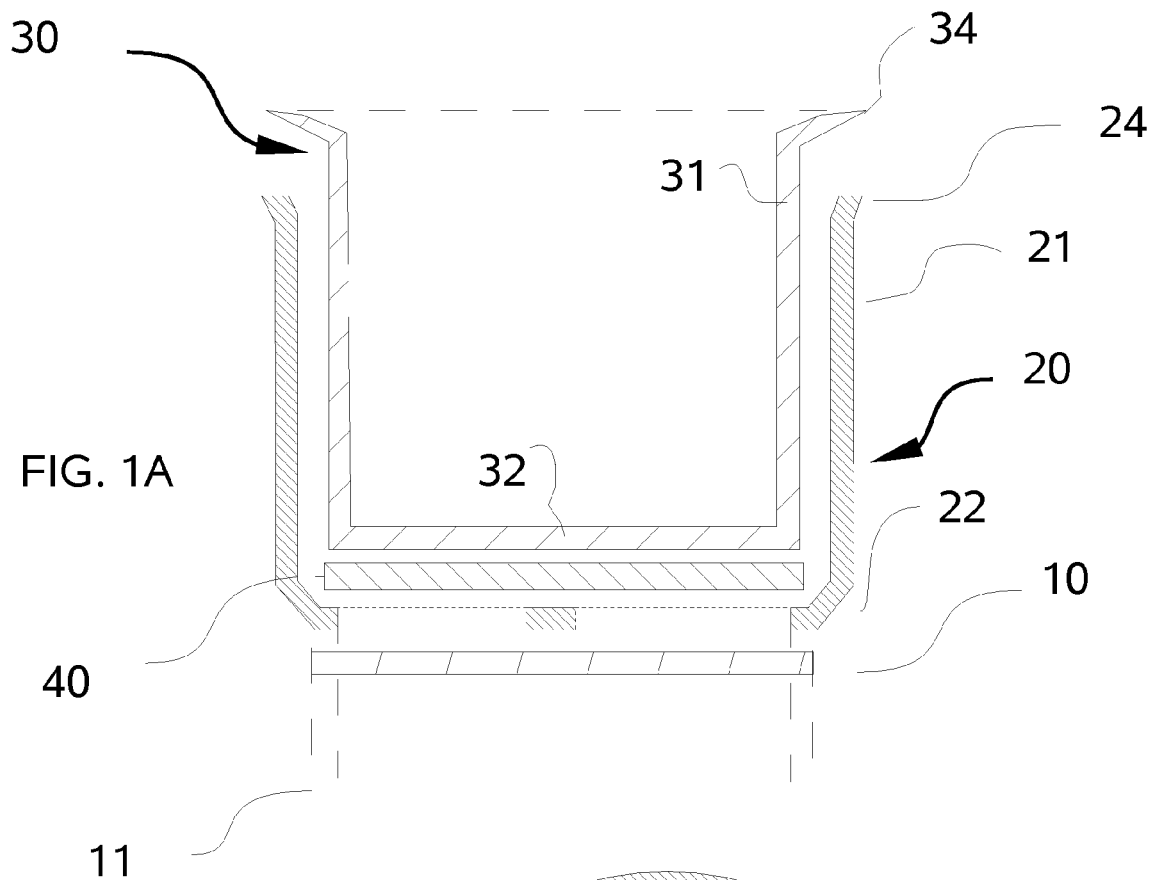
FIG. 1A is a cross-sectional elevation of the nested subcomponents that are bonded to form the completed cooking vessels shown in FIG. 2 and FIG. 3.
Figure 1B:
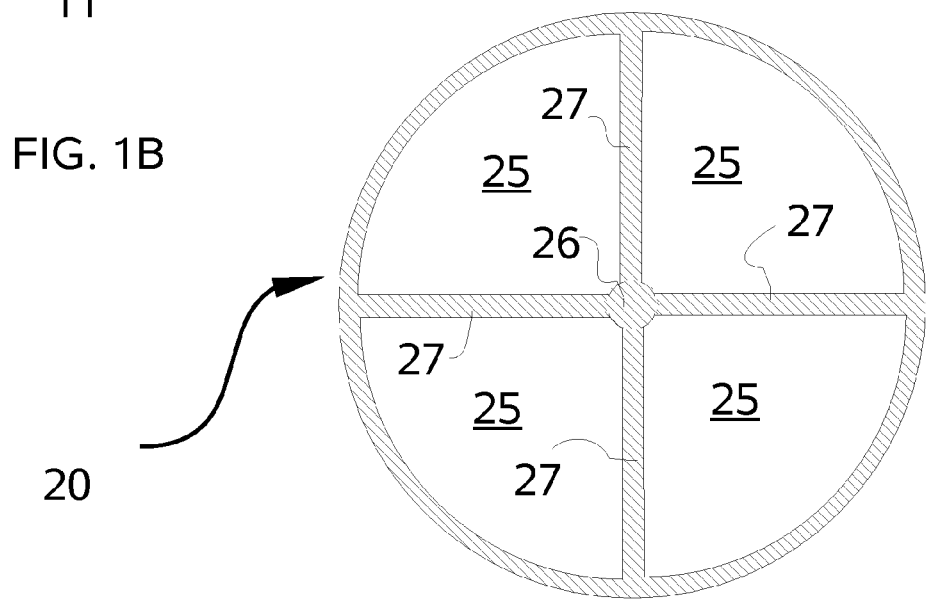
FIG. 1B is a plan view of the bottom of the outer vessel.
Figure 2:
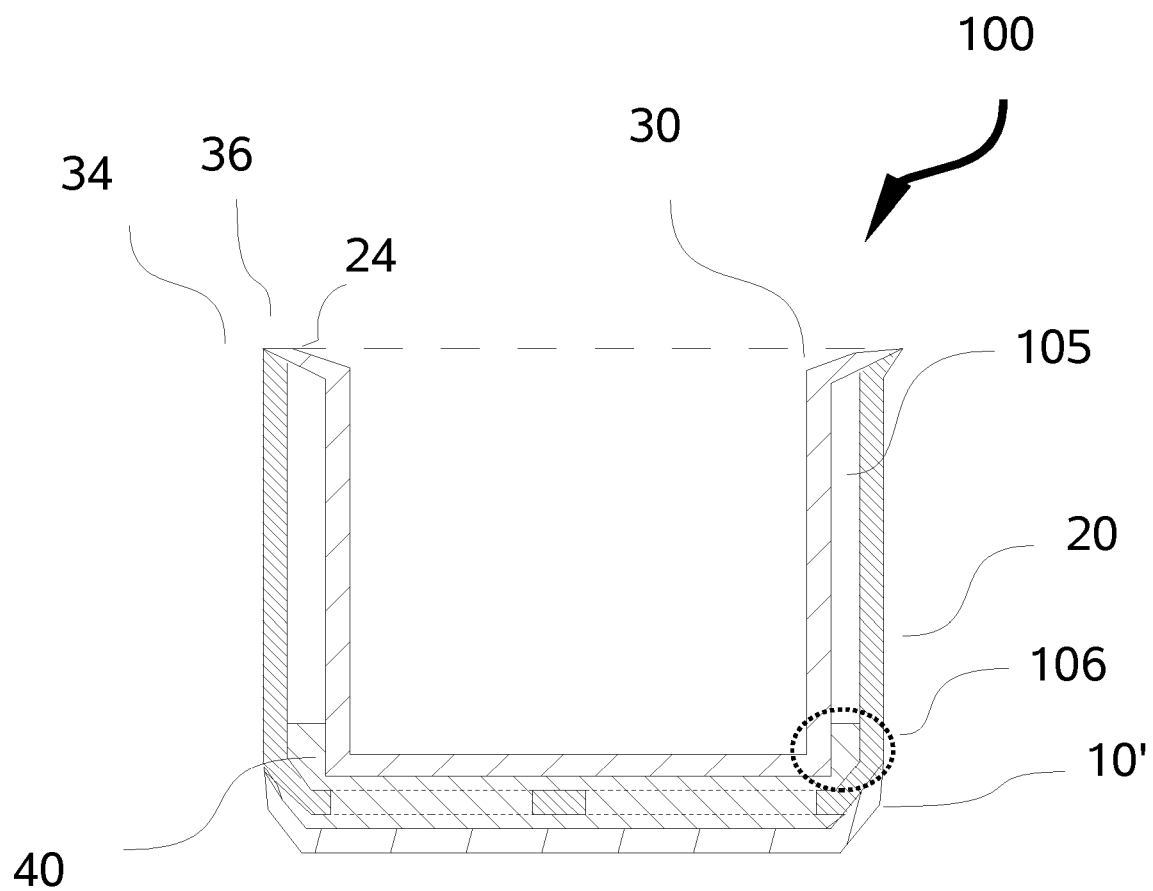
FIG. 2 is a cross-sectional elevation of the completed cooking vessel formed from the components shown in a nested arrangement in FIG. 1A.
Figure 3:
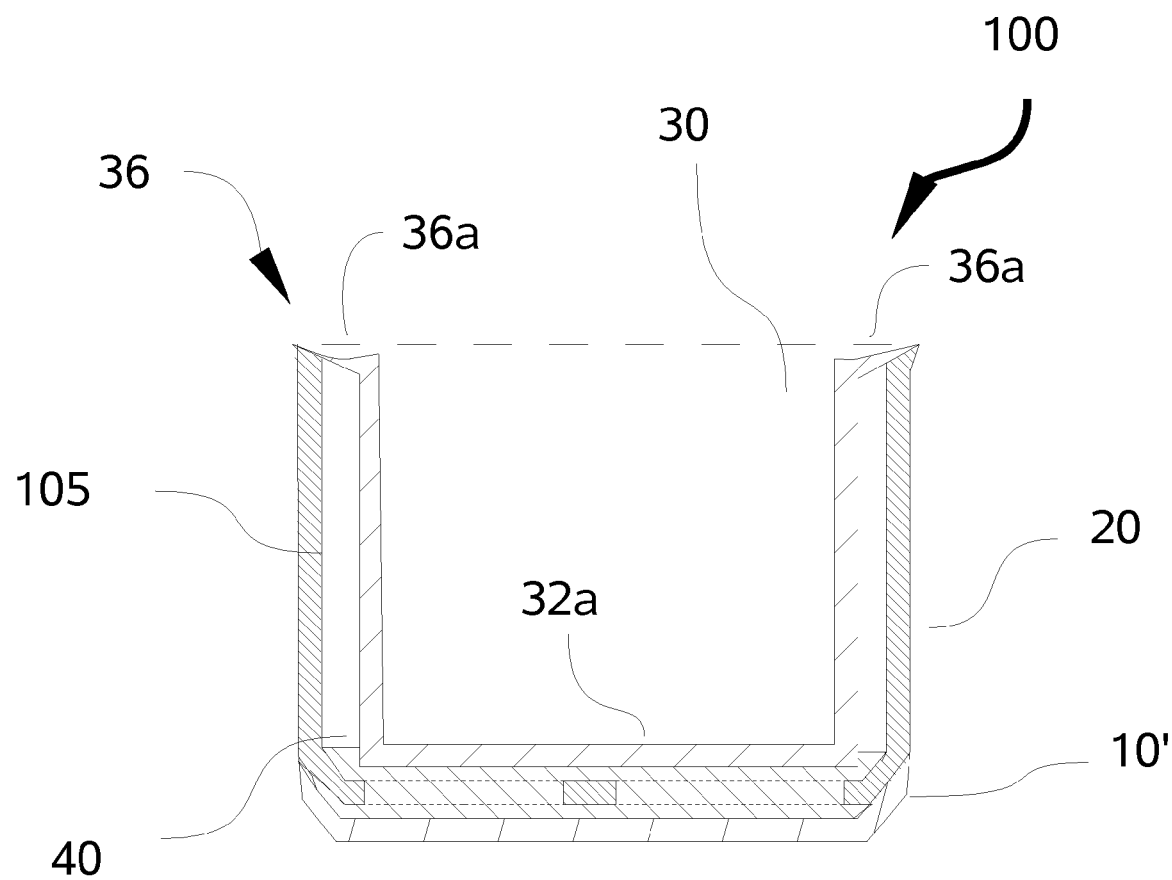
FIG. 3 is a cross-sectional elevation of an alternative embodiment of the completed cooking vessel formed from the components shown in a nested arrangement in FIG. 1A.

In accordance with the present invention, FIG. 1 illustrates the order and arrangement of the subcomponents before attachment and bonding to form the dual wall cooking vessel 100, shown as alternative embodiments in FIG. 2 and FIG. 3. A fluid confining inner vessel 30 has a generally circular or rounded bottom 32 surrounding and connected to substantially upright sidewalls 31, and forms the interior of the completed cooking vessel 100. An outer vessel frame 20 has a generally cylindrical shape defined by substantially upright sidewalls 21 attached to a perforated bottom 22. The upright sidewalls 21 of the inner vessel frame will form the exterior sidewalls of the completed cooking vessel 100. Further, a lower plate 10 of a ferromagnetic alloy is disposed in the nested assembly to ultimately form the exterior bottom of vessel 100, as cap 10'. A substantially planar and disk like sheet of thermally conductive material 40 is interposed between the bottom 32 of inner vessel 30 and the perforated bottom 22 of outer vessel frame 20.

A preferred structure of perforations 25 of outer vessel frame 20 is shown in plan view in FIG. 1B. The perforations 25 are four quarter circle shaped segments arranged around a central circular hub 26, which is thus connected to the periphery of bottom 22 by four intervening strips 27. The strips 27 are arranged in a cross pattern.

The ferromagnetic alloy lower plate 10 has a diameter that is preferably at least 5 to 10 mm larger than the diameter of the disk like sheet of thermally conductive material 40 so that the difference in radius (indicated by reference number 11) between the thermally conductive disk 40 and cap 10 is at least about 2.5 mm. Although the lower base 10 starts out as a generally planar disk like sheet, it tends to deform at the edges during the bonding of the components shown in FIG. 1A so as to from a concave disk or cap that surrounds the lower external perimeter of the bottom 22 of the outer vessel frame 20.

It should be appreciated that the width of the gap 105 (shown in FIGS. 2 and 3) between the side walls of the completed cooking vessel 100 is defined by the larger inner diameter between walls 21 of the outer vessel frame 20 and the smaller outer diameter defined by the exterior walls 31 of inner vessel 30. According it is preferable that the thermally conductive disk 40 have a diameter that is at least equal to the inner diameter between walls 21 of the outer vessel frame 20.

Generally, the inner vessel 30 and the outer vessel frame have a thickness of about 0.5 mm. The thermally conductive disk 40 has a thickness of about 2 to 8 mm, but more preferably 3 to 6 mm.

In order to provide an induction cooking capability the lower plate 10 used to form the final base or cap 10' shown in FIG. 2 is a ferromagnetic metal or alloy, and preferably a ferritic grade of stainless steel such as 430 grade stainless steel. However, the inner vessel 30 and outer vessel frame 20 are preferably a relatively ductile grade of stainless steel, such as 304 grade stainless steel, to facilitate their initial process of fabrication by the deep drawing of relatively planar disks of these materials. As it is generally difficult to deep draw ferritic grades of stainless steel, the disclosed method of constructing the cooking vessel 100 avoids the need to form an inner or outer vessel entirely out ferritic grade stainless steel, yet provides a simplified process for the fabrication of double wall induction grade cookware. The method also maximizes the heat transfer from the induction heated alloy 10 at the bottom of the vessel 100 to the inner cooking surface 36a, as the need for intervening non-ferromagnetic alloys with poorer heat transfer is avoided in this construction.

It should be understood that a deep drawing process is also used to fabricate the preferred contour rims 24 (of the outer vessel frame 20) and 34 (of inner vessel 30) at a high precision to facilitate their bonding together to form the rim 36 of the completed vessel 100.

It should be appreciated that the thermally conductive material 40 is preferably being substantially comprised of aluminum or aluminum alloy. However, the thermally conductive material 40 may also comprise a laminates of multiple layers of thinner aluminum sheet, as well as other materials, with the outer layers being selected for their ability to adhere to the stainless steel of lower plate 10, as well as the material used to form outer vessel frame 20, be it stainless steel or alternatively copper, aluminum, titanium and the like. The thermally conductive material 40 may thus comprise one or more layers of copper, as well as any other ductile material besides aluminum that would bond well to stainless steel or other materials used to form the inner vessel and the outer frame.

Friction or impact bonding is preferably used to attach the component shown in FIG. 1A, with the thermally conductive material 40 bonding to the outer bottom 32 and the inner or upward facing surface of cap 10'. It should also be appreciated that in order to align and eventually seal the rims 24 and 24, which form the final rim 36, it is preferable that the adjacent and overlying vertical components in the nested assembly in FIG. 1 are first mutually centered and spot welded at central circular hub 26 prior to impact bonding. Thus, after spot welding, the now joined assembly of FIG. 1 is heated to about 500° C. just before friction or impact bonding. During friction bonding a forming mandrel, contacting the upper side of bottom 32 is accelerated by a driven mass downward toward a support under the bottom of lower plate 10. As the aluminum that comprises at least the top and bottom of thermally conductive material 40 is the lowest melting point of the material in the assembly and has been preheated to about 80% of its melting point, the friction and heat generated by the sudden impact causes it to initially flow and then fuse with adjacent materials it contacts under pressure. Thus, as the lower plate 10, inner vessel 30 and outer vessel frame 20 components, which are preferably stainless steel, are harder and less ductile than the aluminum that comprises the thermally conductive material 40, the aluminum will also flow around intervening strips or cross-arms 27, locking the inner and outer forms together at the bottom of the completed cooking vessel 100. Further, it is also preferable that the diameter and thickness of the thermally conductive material 40 be selected such that in the impact bonding process this more ductile material is at least partially forced upward to occupy the lower portion 106 of the gap 105 between the inner and outer walls of the completed cooking vessel 100.

Rims 24 and 34 are preferably welded together during fabrication to prevent water from seeping in or entering gap 105. The heating from cooking would rapidly vaporize a small quantity of water trapped in cavity 105, which may present a hazard or damage the vessel 100 in escaping rapidly there from. Further, rim 34 of inner vessel 30 flairs outward in a substantially horizontal direction before terminating at the contact point with upper end of the rim 24 of outer vessel frame 20, thus forming a sealable surface for receiving lid 110. Most preferably, as shown in FIG. 3 rim 36 has a slightly concavity 36a to facilitate sealing with a lid for "waterless" cooking. This slight upward facing concavity 36a in rim 36 provides for the collection of condensed moisture therein, thus providing a sealing liquid between rim 36 and a mating lid of complimentary contour to form a so called "waterless" cooking vessel.

After the impact bonding step, the rim 36 of the cooking vessel 100 is preferably formed in two additional steps.

First, the now aligned and contacting inchoate rims 24 and 34 of outer vessel frame 20 and inner vessel 30 respectively are attached preferably by welded with a mating pair of counter rotating electrodes that substantially conform to the external shape of the inchoate rim surfaces. The counter rotating electrodes grasp the mating rim portions causing the rotation of the bonded assembly about its central axis, thus sequentially exposing the entire periphery of the rims to the welding electrodes. Accordingly, the entire peripheries of the contacting wall edges that form final rim 36 are welded together.

The final rim shape of vessel 100 can be further refined by trimming an annulus through the weld to form the end of rim 36. The trimming tool is preferably a circular cutting tool that processes around the rim to cut away the annulus.

Alternative embodiments of the thus completed double wall vessel 100 are illustrated in FIGS. 2 and 3. However, FIG. 3 illustrates another embodiment of the invention wherein the thermally conductive material 40 does not extend upward into gap 105 above the bottom of the interior cooking surface 32a. It should be appreciated that the embodiment in FIG. 2 is not precluded from also having a rim 36 that is shaped for "waterless" cooking as in this embodiment.

It should be understood that the perforation 25 shown in FIG. 1B may have alternate shapes to quarter circles shown, and need not, when taken as a whole, consume or conform fully with the general circular shape of the bottom of the cooking vessel 100.

Further, these perforations 25 in the bottom of the outer frame 20 are optionally formed either before or after the deep drawing of a planar sheet of metal to form the cylindrical shape of outer vessel frame 20.

It should also be understood that the inner vessel 30 and outer vessel frame 20 can be different metals, and that they can be bonded without forming air gap 105 to ultimately form multiple layer or clad cookware with an induction cooking capable base or cap 10.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claims:

1. A dual wall cooking vessel, the vessel comprising:
   a) an inner vessel having a bottom portion surrounded by vertical walls terminating at an inner rim to form an inner surface for containing fluids,
   b) an outer vessel frame having a substantially circular perforated bottom portion surrounded by vertical walls terminating at an outer rim and surrounding the inner vessel,
   c) wherein the inner vessels is nested within the outer vessel such that the inner rim and the outer rim are concentrically aligned with each other whereby a horizontal cavity is formed between the inner surface of the outer vessel and the outer surface of the inner vessel,
   d) a magnetic cap disposed below the bottom of the outer vessel frame,
   e) a thermally conductive material interposed between the inner surface of the cap and the outer surface of the inner vessel, said material bonding the inner vessel, outer vessel and cap together by extending through perforations in the bottom of the outer vessel to occupy the space between the cap and the bottom of the inner vessel.

2. A dual wall cooking vessel according to claim 1 wherein said thermally conductive material extends upward to partially fill a portion of the horizontal cavity between the vertical walls of said inner vessel and the vertical walls of the said outer vessel frame.

3. A dual wall cooking vessel according to claim 1 wherein the inner and outer vessel are non-magnetic metals.

4. A dual wall cooking vessel according to claim 1 wherein at least one of the inner and outer vessels is stainless steel.

5. A dual wall cooking vessel according to claim 1 wherein the thermally conductive material comprises aluminum.

6. A dual wall cooking vessel according to claim 1 wherein the thermally conductive material comprises layer of aluminum that surround copper.

7. A dual wall cooking vessel according to claim 1 wherein the magnetic cap is stainless steel.

8. A dual wall cooking vessel according to claim 1 wherein the magnetic cap is 430 grade stainless steel and the inner and outer vessels are grade 304 stainless steel.

9. A method of forming a dual wall cooking vessel, the method comprising:
   a) providing a preformed inner vessel having a substantially circular bottom surface and surrounded by upward extending walls that terminate at a rim portion,
   b) providing a preformed outer vessel frame having a substantially circular perforated bottom portion surrounded by vertical walls terminating at an outer rim,
   c) providing a thermally conductive metal plate having substantially the same lateral dimensions as the bottom of the preformed inner vessel,
   d) providing an induction grade metal base having a larger diameter than the bottom of the outer vessel frame,
   e) nesting in a pre-lamination assembly;
      i) the inner vessel within the outer vessel frame,
      ii) the thermally conductive metal plate below the inner vessel,
      iii) the induction grade metal base below the bottom of the outer vessel frame,
   f) impact bonding the inner vessel to the outer vessel frame such that the thermally conductive material extends between the perforation in the bottom of outer inner vessel frame bonding the outer vessel frame to the between the inner vessel and the induction grade metal cap.

10. A method of forming a dual wall cooking vessel according to claim 9 wherein the inner vessel nests within the outer vessel frame leaving a horizontal cavity between the upward extending walls thereof.

11. A method of forming a dual wall cooking vessel according to claim 10, the method further comprising the step of welding the rim portion of the inner vessel to the outer rim portion of the outer vessel frame to seal the horizontal cavity between the inner vessel and the outer vessel.

12. A method of forming a dual wall cooking vessel according to claim 11 further comprising trimming an annular portion of the welded inner vessel rim and outer vessel rim to form an upper rim of the dual wall vessel that seals the cavity between the inner vessel and the outer vessel.

13. A method of forming a dual wall cooking vessel according to claim 10 wherein the thermally conductive material extends upward to at least partially fill the horizontal cavity.

14. A method of forming a dual wall cooking vessel according to claim 13 wherein the thermally conductive material comprises aluminum.

15. A method of forming a dual wall cooking vessel according to claim 9, the method further comprising the step of:
a) concentrically aligning the pre-lamination assembly with the axis of at least one of the inner vessel and outer vessel frame prior to said step of impact bonding, and
b) welding the concentrically aligned pre-lamination assembly together at the center thereof.

16. A method of forming a dual wall cooking vessel according to claim 15,
wherein the perforations are quarter circle arcs whereby a pair of cross-shaped arms that remain there between connect the sidewalls of the outer vessel to a central hub at the bottom of the outer vessel.

17. A method of forming a dual wall cooking vessel according to claim 9 wherein thermally conductive metal plate comprises aluminum.

18. A method of forming a dual wall cooking vessel according to claim 9 wherein the thermally conductive metal plate comprises one or more layers of aluminum.

19. A method of forming a dual wall cooking vessel according to claim 9 wherein the thermally conductive metal plate comprises two or more layers of aluminum at least partially surrounding a layer of copper.

20. A method of forming a dual wall cooking vessel according to claim 9, the method further comprising the step of welding the rim portion of the inner vessel to the outer rim portion of the outer vessel frame.

* * * * *